(12) United States Patent
Biskeborn

(10) Patent No.: US 7,715,141 B2
(45) Date of Patent: May 11, 2010

(54) SHIELD BIASING FOR MR DEVICES

(75) Inventor: Robert Glenn Biskeborn, Hollister, CA (US)

(73) Assignee: International Business Machines Corporation, Armonk, NY (US)

( * ) Notice: Subject to any disclaimer, the term of this patent is extended or adjusted under 35 U.S.C. 154(b) by 662 days.

(21) Appl. No.: 11/684,485

(22) Filed: Mar. 9, 2007

(65) Prior Publication Data
US 2008/0221981 A1  Sep. 11, 2008

(51) Int. Cl.
*G11B 5/03* (2006.01)
(52) U.S. Cl. ......................................... 360/66; 360/323
(58) Field of Classification Search ...................... None
See application file for complete search history.

(56) References Cited

U.S. PATENT DOCUMENTS

| 5,309,295 | A | 5/1994 | Bailey et al. ................... 360/66 |
|---|---|---|---|
| 5,701,213 | A | 12/1997 | Cameron et al. ............... 360/66 |
| 6,252,735 | B1 | 6/2001 | Chung et al. ................... 360/67 |
| 6,331,921 | B1 | 12/2001 | Davis et al. ..................... 360/67 |
| 6,344,952 | B1 * | 2/2002 | Biskeborn et al. ............. 360/319 |
| 6,424,505 | B1 * | 7/2002 | Lam et al. ...................... 360/323 |
| 2003/0193731 | A1 | 10/2003 | Choi .............................. 360/66 |
| 2003/0210501 | A1 * | 11/2003 | Voldman ....................... 360/323 |
| 2004/0252398 | A1 | 12/2004 | Li et al. ......................... 360/66 |

FOREIGN PATENT DOCUMENTS

EP   0720150 B1   10/2003

* cited by examiner

*Primary Examiner*—Jason C Olson
(74) *Attorney, Agent, or Firm*—Zilka-Kotab, PC

(57) ABSTRACT

A magnetic data storage system according to one embodiment includes a head having a reader, the reader further comprising a shield, a sensor, and leads coupled to the sensor; a charge clamp circuit electrically coupling the shield to the leads; and a bias circuit for passing a bias current through the sensor via the leads; wherein the bias circuit maintains a potential of the shields at about a ground potential.

20 Claims, 4 Drawing Sheets

SHIELD BIASING FOR MR DEVICES

FIELD OF THE INVENTION

The present invention relates to magnetic storage systems, and more particularly, this invention relates to a magnetic storage system, and component thereof, having reader shields at definable potentials.

BACKGROUND OF THE INVENTION

Business, science and entertainment applications depend upon computers to process and record data, often with large volumes of the data being stored or transferred to nonvolatile storage media, such as magnetic discs, magnetic tape cartridges, optical disk cartridges, floppy diskettes, or floptical diskettes. Typically, magnetic tape is the most economical means of storing or archiving the data. Storage technology is continually pushed to increase storage capacity and storage reliability. Improvement in data storage densities in magnetic storage media, for example, has resulted from improved medium materials, improved error correction techniques and decreased areal bit sizes. The data capacity of half-inch magnetic tape, for example, is now measured in hundreds of gigabytes on 512 or more data tracks.

The improvement in magnetic medium data storage capacity arises in large part from improvements in the magnetic head assembly used for reading and writing data on the magnetic storage medium. A major improvement in transducer technology arrived with the magnetoresistive (MR) sensor originally developed by the IBM® Corporation. Later sensors using the GMR effect were developed. AMR and GMR sensors transduce magnetic field changes to resistance changes, which are processed to provide digital signals. Data storage density can be increased because AMR and GMR sensors offer signal levels higher than those available from conventional inductive read heads for a given read sensor width and so enable smaller reader widths and thus more tracks per inch. Moreover, the sensor output signal depends only on the instantaneous magnetic field intensity in the storage medium and is independent of the magnetic field time-rate-of-change arising from relative sensor/medium velocity. In operation the magnetic storage medium, such as tape or a magnetic disk surface, is passed over the magnetic read/write (R/W) head assembly for reading data therefrom and writing data thereto.

In any of the above-mentioned types of heads, e.g., AMR, GMR, MTJ, etc., forces are present that can produce adverse effects on the head. For example, in a tape-based data storage system, the tape acquires a charge as it moves through the tape path and over the head. In the head, sensor element potentials are generally established by the circuits that provide the sensing currents passing therethrough. The sensor shield potentials may or may not match the potentials on the associated sensor elements. Further, the sensor shields and other parts of the head may become charged by interaction with the tape. Thus, as can be appreciated, multiple and varying voltages may be found not only between the tape and the head, but also between various components in the head, e.g., substrate, shields and sensor element. As will soon become apparent, these voltages are believed to be at least partly responsible for adverse tribological interactions on the head.

Compounding the problem is the electric field distribution in the head ceramic. The wafer material used for magnetic recording heads (commonly know as AlTiC), is a ceramic composite material comprising a matrix of insulative aluminum oxide (alumina, $Al_2O_3$) plus an irregular but interconnected network of electrically conductive titanium carbide (TiC). The uneven distribution of TiC creates an irregular electric field at the interlace with the typically overlying insulator. The electric fields at grain edges can be several fold higher than the average field. These high fields are associated with adverse tribological effects, including electrostatic debris deposition and pitting of the head insulator due to electric discharges. These high fields also promote electrical discharge into the tape, thereby charging the tape.

Due to the varying voltages and irregular electric fields between the various parts of a head as well as between head and tape, magnetic heads tend to suffer from adverse tribological interactions, which include electrical discharge, tape changes, head erosion, debris buildup, chemical conversion, head sensor shorting, etc. In both piggyback and interleaved heads, tribological effects are believed to be aggravated by excessive substrate and/or media voltages. When the substrate is electrically floating, relative motion between the head and recording medium may produce substrate and media voltage swings on the order of several 10 s of volts. Such voltages are strongly implicated in unfavorable tribological processes such as electrochemical reactions, electrostatic accumulation of debris, and even certain types of wear.

In shielded MR heads, the lower reader shield of each reader is in close proximity to the substrate, separated therefrom by a thin insulator, e.g., on the order of 0.5 to 5 micron thick. The voltage differences between the lower reader shields and substrate is problematic due to their close proximity, and is compounded by the potentially large localized electric fields created by a conductive substrate, e.g., of AlTiC. Such electric fields are implicated in aggravated accumulation of conductive materials that can actually short the MR sensor to its shields and in turn to the substrate.

Consider the following example. Suppose reader shield S2 and the substrate are separated by a thin insulator. Suppose shield S2 (positioned towards the substrate) is at 1.5 V, and the substrate is at 6.5 V. The difference is 5 V. If the space between them is 0.5 microns, the electric field (gradient) is 10 V per micron, a very large value. For comparison, sparking in air, for example as observed on clothing, occurs from a gradient of approximately 1 V per micron. In the example presented, the gradient is ten times larger. Other unusual effects have been observed, including formation of solid water at room temperature in the presence of large electric fields. Furthermore, the irregular conductive grain structure of AlTiC further concentrates the fields, which can be several times higher than in this example.

Several solutions have been contemplated, but each of these has drawbacks. These solutions include biasing the substrate to match the potential of the shields. However, this requires that additional biasing circuitry be coupled to the substrate, thus contributing to the overall complexity of the system. Grounding the shields in a multi-sensor head is generally impractical. Even if the shields are grounded, adverse tribological effects may occur depending on the tape electrical and mechanical characteristics and other aspects of the tape path, such as ground or floating of guides. Further, any shorting between the sensor and a grounded shield could result in MR signal reduction or noise, or even no signal.

As alluded to above, another problem encountered is that the readers are susceptible to shield-shorting which may occur in combination with substrate shorting, as a result of running magnetic recording tape having insufficient lubricity across the head at very low humidity, which in turn is found to produce accumulations of conductive material on the MR elements, shields and substrate. Shorting is a well-known cause of reading errors. Proposed solutions, such as prerecessing and/or insulating heads, providing sensor-piggybacked fences and running ionization fans, require changes in head processing, design or implementation, respectively, and so are far more involved than the present invention. For instance, forcibly recessing the sensor so that its components do not develop the conductive accumulation is difficult to manufacture, and also generally produces undesirable magnetic signal spacing loss for the data readers, which must read much higher frequencies than the servo readers.

There is accordingly a clearly-felt need in the art for a magnetic device with reduced susceptibility to shorting and/or improved tribological characteristics. These unresolved problems and deficiencies are clearly felt in the art and are solved by this invention in the manner described below.

SUMMARY OF THE INVENTION

A magnetic data storage system according to one embodiment includes a head having a reader, the reader further comprising a shield, a sensor, and leads coupled to the sensor; a charge clamp circuit electrically coupling the shield to the leads; and a bias circuit for passing a bias current through the sensor via the leads; wherein the bias circuit maintains a potential of the shields at about a ground potential.

A magnetic data storage system according to another embodiment includes a head having a reader, the reader further comprising a shield, a sensor, and leads coupled to the sensor; a charge clamp circuit electrically coupling the shield to the leads; and a bias circuit for passing a bias current through the sensor via the leads, the bias circuit including a positive voltage source and a negative voltage source.

A magnetic data storage system according to yet another embodiment includes a head having a plurality of readers formed above a common substrate, each reader further comprising a shield, a sensor, and leads coupled to the sensor; for each reader, a charge clamp circuit electrically coupling the shield to the leads, and a bias circuit for passing a bias current through at least one of the sensors via the leads, wherein the bias circuit maintains a potential of the shields at about a ground potential.

A magnetic data storage system according to a further embodiment includes a head having a plurality of readers formed above a common substrate, each reader further comprising a shield, a sensor, and leads coupled to the sensor; for each reader, a charge clamp circuit electrically coupling the shield to the leads; and a bias circuit for passing a bias current through the sensor via the leads, the bias circuit including a positive voltage source and a negative voltage source.

Any of these embodiments may be implemented in a tape drive system, which may include a magnetic head as recited above, a drive mechanism for passing a magnetic recording tape over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

BEST MODE FOR CARRYING OUT THE INVENTION

Figure 1:
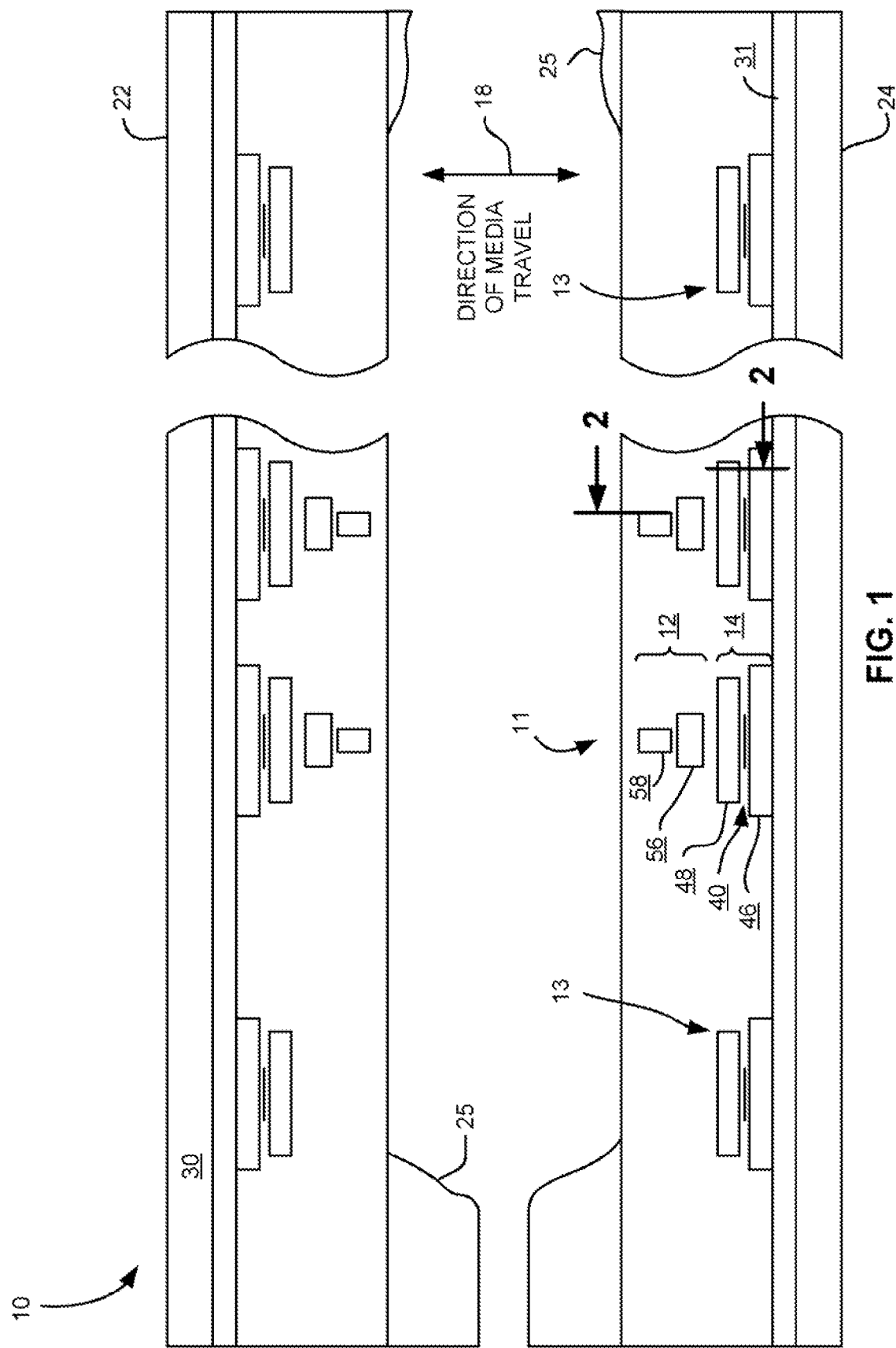
FIG. 1 is a representative tape bearing surface view of a multitrack tape head having a multitude of R/W pairs in a piggyback configuration according to one embodiment of the present invention.

The following description is the best mode presently contemplated for carrying out the present invention. This description is made for the purpose of illustrating the general principles of the present invention and is not meant to limit the inventive concepts claimed herein. Further, particular features described herein can be used in combination with other described features in each of the various possible combinations and permutations.

In the drawings, like and equivalent elements are numbered the same throughout the various figures.

In one approach, the present invention is directed to a magnetic data storage system in which the potentials of some or all the reader shields may be set to a predetermined potential, such as about a ground potential. In generally preferred embodiments, the shields are connected to the MR leads via a charge clamp. Then, setting the shields to the system ground potential (or other appropriate potential) is desirable for mitigating surface shorting that otherwise may occur. For instance, during low humidity operation, MR read sensors may exhibit errors or even failure due to accumulation of conductive material on the conducting parts of the head. Further, should debris accumulate and create a short from the sensor to the shield or sensor to the substrate, a low or nonexistent voltage differential therebetween may mitigate the effects of such a short.

A basic implementation of the present invention includes a head having a reader, the reader further comprising a shield, a sensor, and leads coupled to the sensor. A charge clamp circuit electrically couples the shield to the leads. A bias circuit is also present for passing a bias current through the sensor via the leads. The bias circuit maintains both a bias current and a potential of the shields at some potential, such as about a ground potential.

Another embodiment of the present invention includes a head having a reader, the reader further comprising a shield, a sensor, and leads coupled to the sensor. A charge clamp circuit electrically couples the shield to the leads. A bias circuit is present for passing a bias current through the sensor via the leads, the bias circuit including a positive voltage source and a negative voltage source.

It should be noted that while much of the following description is presented in terms of a tape-based magnetic storage system having a R/W head in a piggyback configuration, the teachings herein are applicable to other types of magnetic data storage systems including those implementing interleaved heads or heads having a single reader and/or writer thereon.

The interleaved R/W magnetic tape head with MR sensors allows increased track density on the tape medium while providing bi-directional read-while-write operation of the tape medium to give immediate read back verification of data just written onto the tape medium. Tape recording systems may alternatively implement arrays of "piggyback" R/W pairs, where the writer and reader in each pair are aligned in the direction of tape travel.

FIG. 1 shows the tape bearing surface (TBS) of an embodiment of a magnetoresistive (MR) head assembly 10 having a plurality of R/W pairs in a piggyback configuration formed on a common substrate 30 and an optional electrically insulative layer 31. The writers, exemplified by the write head 12 and the readers, exemplified by the read head 14, are aligned parallel to a direction of travel of a tape medium thereacross to form a R/W pair, exemplified by the R/W pair 11. Several R/W pairs 11 may be present, such as 8, 16, 32 pairs, etc. The R/W pairs 11 as shown are linearly aligned in a direction generally perpendicular to a direction of tape travel thereacross. However, the pairs may also be aligned diagonally, etc. Servo readers 13 are positioned on the outside of the array of R/W pairs, the function of which is well known.

Generally, the magnetic tape medium moves in either a forward or reverse direction as indicated by arrow 18. The magnetic tape medium and head assembly 10 operate in a transducing relationship in the manner well-known in the art.

The piggybacked MR head assembly 10 includes two thin-film modules 22 and 24 of generally identical construction. Modules 22 and 24 are joined together with a space or gap present between closures 25 thereof (partially shown) to form a single physical unit to provide read-while-write capability by activating the writer of the leading module and reader of the trailing module aligned with the writer of the leading module parallel to the direction of tape travel relative thereto.

When a module 22, 24 of a piggyback head 10 is constructed, layers are formed on an electrically conductive substrate 30, e.g., of AlTiC, in generally the following order for the R/W pairs 11: an insulating layer 31, a first shield 46 typically of an iron alloy such as NiFe (permalloy), CZT or Al—Fe—Si (Sendust), a sensor 40 for sensing a data track on a magnetic medium, a second shield 48 typically of a nickel-iron alloy (e.g., 80/20 Permalloy), first and second writer pole tips 56, 58, and a coil (not shown). The first and second writer poles 56, 58 may be fabricated from high magnetic moment materials such as 45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

Figure 2:
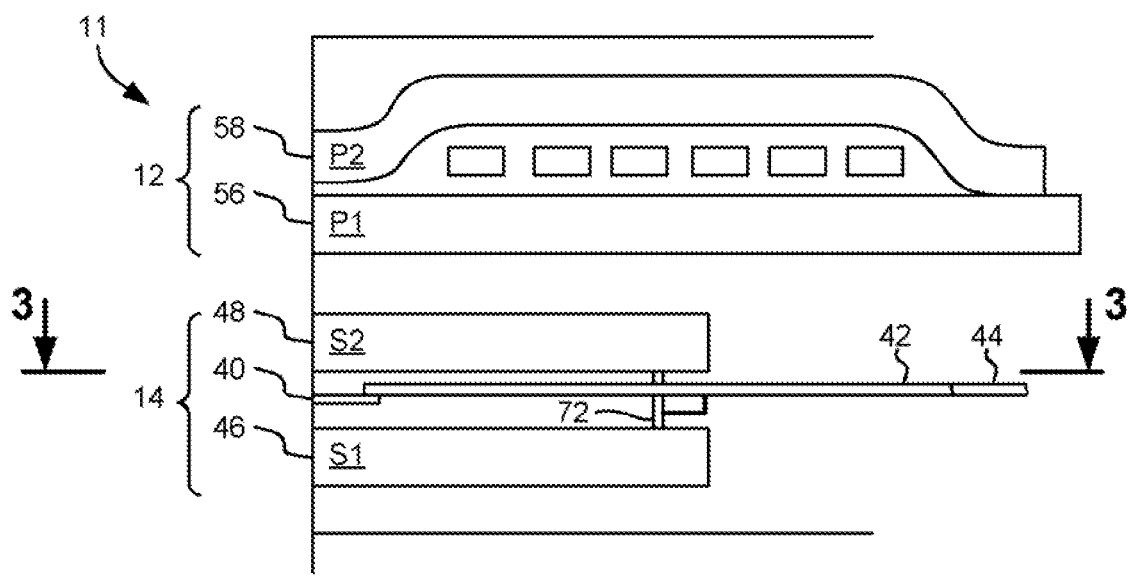
FIG. 2 is a partial cross sectional view taken from Line 2-2 of FIG. 1.

FIG. 2 represents in detail a portion of module 24 from FIG. 1, including portions of an exemplary R/W pair 11. The thin-film elements shown in FIG. 2 are illustrated showing submicron detail in the usual manner and are not to scale. The reader 14, which may be a magnetoresistive (MR) sensor element 40 (e.g., GMR, AMR, MTJ, etc.) is disposed between the two shields 46 and 48 (S2 & S1), with each MR sensor end coupled to an electrical lead (conductor) 42 and 44. The relative disposition of electrical leads 42, 44 may be better appreciated with reference to FIG. 3, which illustrates a cross-sectional view of the reader 14 from FIG. 2 taken along section line 3-3.

With continued reference to FIG. 2, in tape systems, the shields 46, 48 can become charged by the action of the tape brushing thereacross. If the shields 46, 48 are floating (not connected or grounded), they can charge up to a high voltage (e.g., 10 V or higher), then discharge, potentially through the MR sensor 40. The backside of the tape does not have a magnetic coating. Rather, the backside of the tape is electrically conductive and is rougher than the magnetic side. The roughness assists in winding the tape onto a reel. To make the backside of the tape conductive and rough, carbon particles are formed thereon. The carbon itself can flake off and run across the tape-head interface, creating electrically conductive bridging. The particles can create enough of a bridge to initiate a discharge of the shield into the sensor, creating a spike in the signal.

A charge clamp circuit removes the charge, and sets the voltage (Vshield) of the shield at roughly the same voltage as the sensor, as described immediately below.

Figure 3:
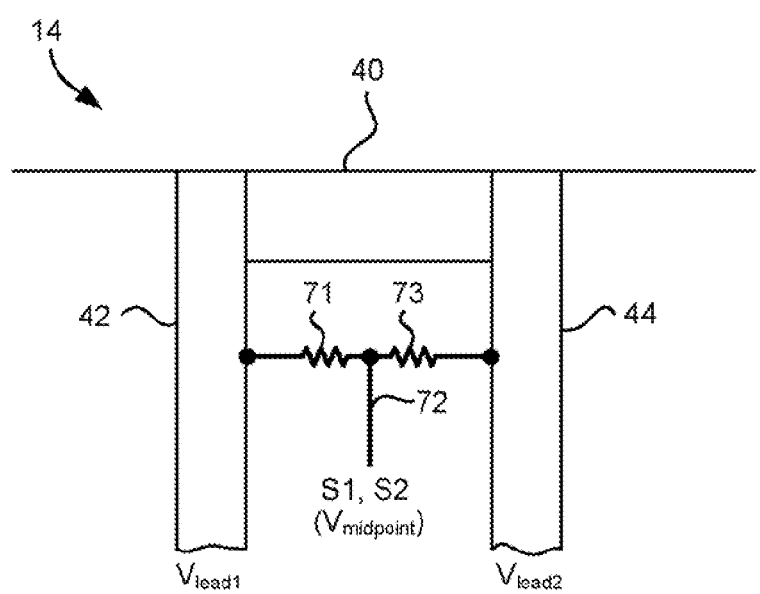
FIG. 3 is a partial cross sectional view taken from Line 3-3 of FIG. 2.

According to an embodiment of the invention, within each read head, which is exemplified by reader 14, MR element shields 46, 48 may also be connected to the leads 42, 44 of the sensor 40 via a circuit 72, as shown in FIGS. 2 and 3, in a configuration referred to as a charge clamp. As shown in FIG. 3, a preferred charge clamp includes resistors 71, 73 positioned between the leads 42, 44, thereby forming a conducting path from leads 42 to 44. The resistors 71, 73 should be large enough so as not to short circuit the MR reader. Resistors 71, 73 are preferably of equal magnitude for reasons which will soon become apparent, but may be of differing magnitude. In general, the resistors 71, 73 may have a resistance of less than about 500 kiloOhms (kOhms). Also note that resistors 71, 73 (and all other resistors described herein) may each be formed of multiple resistors, active resistors, tunable resistors, etc.

The shields 46, 48 are coupled to the circuit at a point between the resistors 71, 73. The circuit acts as a voltage divider, where the voltage (Vshield) of the shields is at a level near a midpoint between the lead voltages, e.g., $V_{midpoint} = (V_{lead1}*V_{lead2})/2$. This midpoint is about the voltage of the midpoint of the sensor 40 between the leads 42, 44. Thus, the sensor 40 and shields 46, 48 are at about the same voltage. As noted above, voltage differentials on MR devices are strongly implicated in unfavorable tribological processes such as electrochemical reactions and electrostatic accumulation of debris. Because the sensor 40 and shields 46, 48 are at about the same voltage level, tribological effects such as corrosion and accumulations are reduced. Further, the chance of an electrical discharge between the shields 46, 48 and the sensor 40 is minimized.

The electrical connections exemplified by charge clamp circuit 72 (FIG. 2) may be made independently for each reader-writer pair (if present). Charge clamp circuit 72, or portions thereof, are preferably non-magnetic and may be formed by depositing a layer of conductive metal, such as tantalum, or any other useful material of preferably high to intermediate resistivity.

In another embodiment, the charge clamp circuit 72 may include only one resistor 71 or 73.

While not shown, the writer poles may also be coupled to the charge clamp circuit in some embodiments.

Figure 4:
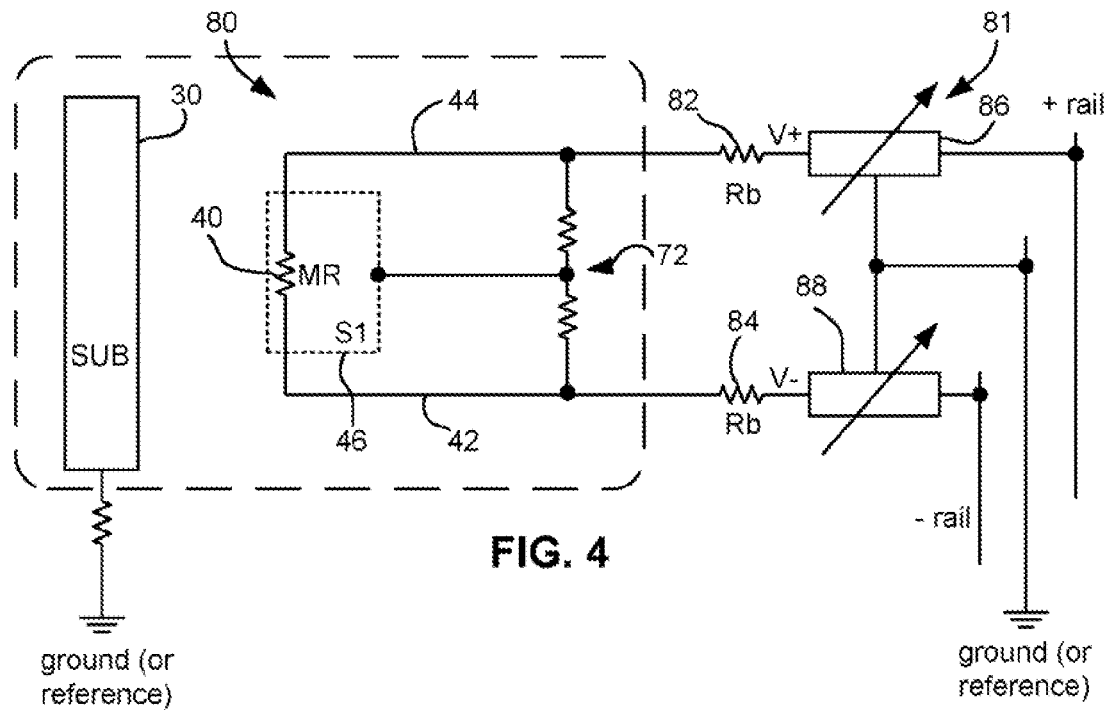
FIG. 4 is a circuit diagram of a system according to one embodiment of the present invention.

FIG. 4 illustrates a system 80 according to one embodiment of the present invention. As shown, the system 80 includes an MR bias circuit 81. The MR bias circuit 81 is coupled to the leads 42, 44 that are in turn coupled to the sensor 40 and to the charge clamp circuit 72.

As shown in this embodiment, positive bias supply voltage source 86 and a negative bias supply voltage source 88 provide the bias current to the MR sensor 40, as well as set the potential of the shields in cooperation with the charge clamp circuit 72, as described above. The shields are generally at the MR element midpoint potential.

Biasing resistors (Rb) 82, 84 may be positioned between the positive bias supply voltage source 86 and sensor 40, and sensor 40 and the negative bias supply voltage source 88, respectively.

In a preferred embodiment, equal and opposite bias supply voltages set the shields at about ground potential. Typically, ground will be about 0 volts. Accordingly, the positive bias supply voltage source 86 may supply a voltage of $V_B/2$ while the negative bias supply voltage source 88 supplies a voltage of $-V_B/2$, where $V_B$ is the desired bias voltage. Again, the charge clamp circuit 72 shown acts as a voltage divider, where the voltage (Vshield) of the shields is at a level near a midpoint between the supplied voltage, e.g., $V_{midpoint}=(V_B+(-V_B))/2=0$.

Figure 5:
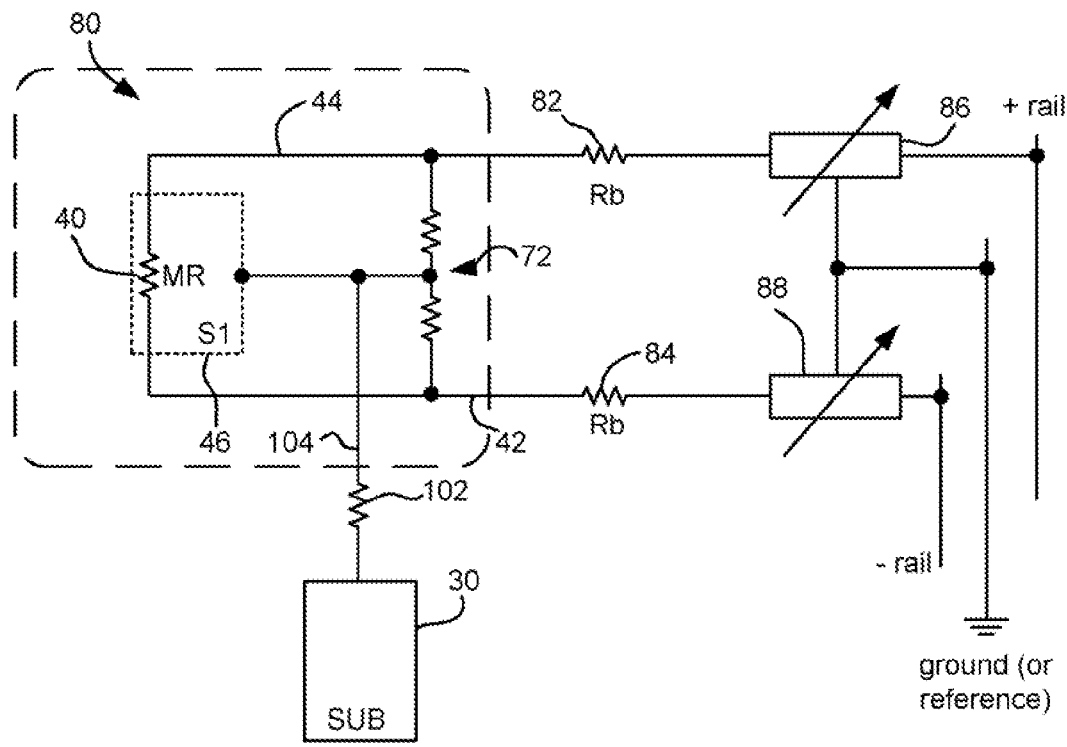
FIG. 5 is a circuit diagram of a system according to another embodiment of the present invention.

Also, it should be kept in mind that the charge clamp circuit 72 may have configurations other than those shown in FIG. 4. For example, as shown in FIG. 5, the shield(s) 46 may be connected to the MR sensor 40 via a single resistor. If the shields are connected to the MR sensor via a single resistor, then the two supply voltages may be adjusted accordingly to set the potential of the shields to about zero volts (or other potential).

Further, where system ground is set at some potential, the bias supply voltages may be set accordingly to set the potential of the shields to match the ground potential.

The MR biasing preferably uses positive and negative rails, which can be used for all sensors in a module. Referring to FIGS. 4 and 5, the matched series bias resistors 82, 84 can be trimmed for providing tailored bias current and midpoint potential to each device when using fixed supply voltages.

Alternatively, each sensor can have its own supply voltage pair, e.g., from independent regulators, which would generally run from source rails 92, 94. As shown, the source rails 92, 94 provide positive and negative voltages. Alternatively, a DC voltage inverter may be employed to provide a negative voltage from the positive rail, or vice versa, thereby obviating the need for one of the rails.

In a generally preferred approach, the bias supply voltage sources 86, 88 may each be a three terminal regulator, e.g., one positive and the other negative. As the name implies, a regulator regulates a voltage.

For example, the "78" series of three terminal regulators (7805, 7812, etc.) regulate positive voltages while the "79" series (7905, 7912, etc.) regulate negative voltages. Often, the last two digits of the device number are the output voltage; e.g., a 7805 is a +5 V regulator, while a 7915 is a -15 V regulator.

The pinout for a three-pin voltage regulator is typically as follows:

1: Voltage in
2: Ground or reference
3: Voltage out

After one connects the appropriate pins to external resistors and ground, the regulated output voltage appears on the output pin.

In fixed voltage regulators, the reference pin is tied to ground 96, whereas in variable regulators the reference pin is connected to the center point of a fixed or variable voltage divider fed by the regulator's output. A variable voltage divider (such as a potentiometer) allows the user to adjust the regulated voltage.

"Fixed" three-terminal linear regulators are commonly available to generate fixed voltages of plus 3 V, and plus or minus 5 V, 9 V, 1.2 V, or 15 V when the load is less than about 7 amperes.

For output voltages not provided by standard fixed regulators, commonly-available "adjustable" three-terminal linear regulators may be used. An adjustable regulator generates a fixed low nominal voltage between its output and its 'adjust' terminal (equivalent to the ground terminal in a fixed regulator). The "317" series (+1.2V) regulates positive voltages while the "337" series (-1.2V) regulates negative voltages. The adjustment is performed by constructing a potential divider with its ends between the regulator output and ground, and its centre-tap connected to the 'adjust' terminal of the regulator. The ratio of resistances determines the output voltage.

More complex regulators are available in packages with more than three pins, including dual in-line packages. Other types of regulators are also contemplated.

In particularly preferred embodiments, regulators functioning similarly to those set forth above are integrated into an integrated circuit (IC), such as the IC package for driving multiple transducers or heads. In one approach, the IC packages are of a type suitable for integration on the recording device controller board. For instance, application specific integrated circuits (ASICs) may be used.

Also as noted above, for output voltages not provided by standard fixed regulators, the matched series bias resistors 82, 84 can be trimmed for providing tailored bias current to each MR sensor 40 when using fixed supply voltages.

With continued reference to FIG. 4, the substrate 30 may be connected to system ground via one or more resistors.

Referring to FIG. 5, one or both of the shields of a given reader may be operatively connect to a third resistor 102, e.g., thin film resistor of a shield biasing circuit 104 (the other two resistors are part of the charge clamp 72 and connect to the leads 42, 44). The biasing circuit 104 can be coupled to the charge clamp circuit 72 as shown, but could also be connected directly to the bottom shield, the upper shield, etc.

As yet another alternative, zero volts (or other value) may be sourced to the substrate via an independent substrate biasing circuit, which could be similar in configuration to the MR biasing circuit.

Figure 6:
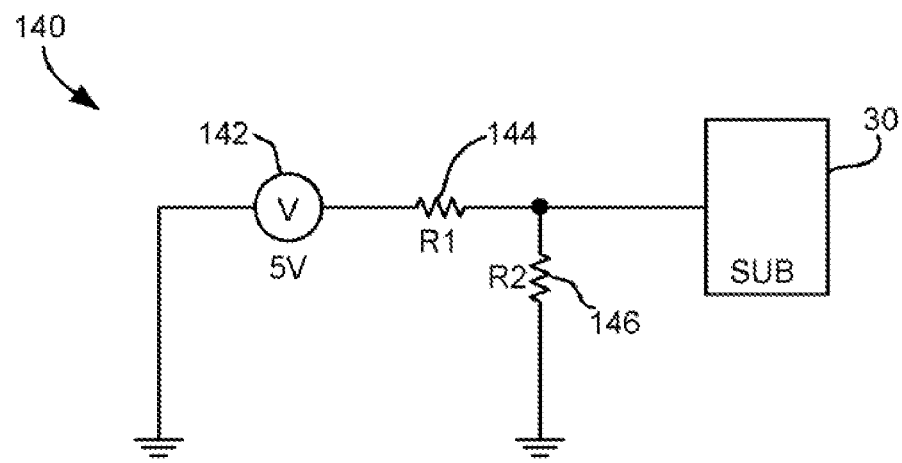
FIG. 6 is a circuit diagram of a substrate biasing circuit according to one embodiment of the present invention.

FIG. 6 depicts an illustrative substrate biasing circuit 140 according to one embodiment of the present invention. As shown, the substrate biasing circuit 140 includes a series resistance to ground. In this configuration, a voltage source 142 supplies a fixed voltage to the pair of resistors R1 and R2 144, 146. The circuit 140 is coupled to the substrate 30 at a point between the resistors (R1, R2) 144, 146, and thereby is able to set Vsub to any desired level.

The power supply in the drive can be used as the voltage source 142. In this example, the power supply is 5 V, but a source providing any desired value can be used. The power supply has zero input impedance, so looking back into the circuit from the substrate 30, the circuit appears to have resistor R1 144 in parallel with resistor R2 146 to ground.

The series resistance to ground in the substrate biasing circuit 140 of FIG. 10 or equivalent circuit may be in the range of 50-200 times the MR bias circuit individual bias resistor values. For instance, assuming each bias resistor resistance value is 1.50 Ohms, then the parallel combination of R1 and R2 would have a value of 7500 to 30000 Ohms. By setting this impedance to ground via resistors R1 and R2 144, 146, a debris bridge of say a few kOhms between the substrate and shield in series with an additional bridge between the sensor element and the shield at worst would draw only a small portion of the MR bias current through the substrate path to ground. Making the resistors R1 and R2 144, 146 larger might seem preferable for mitigating current, shunting and other problems. Series resistances much larger than the individual Rb values are less preferred, as the substrate voltage may begin to be affected by tribocharging from the tape. For example, the tape itself may become charged by the motion of the tape through the drive and over the head. This phenomenon is commonly referred to as tribocharging. As a result, substrate currents of the order of several microamperes typically flow between head and tape because the substrate is connected to ground. Since the effective source impedance for the tribocurrent from the tape is of the order of 10 s of MegOhms (MOhms), substrate resistances of the order of MOhms would not drop the tribovoltage, which would thus be in the volts range. Thus, the largest preferred series resistance is in the 10-50 kOhm range, assuming an Rb resistance, value of about 150 Ohms and $V_{sub} \approx V_{shield} \approx 1.50$ V. Higher and lower resistance values and ranges, however, are considered to be within the scope of the present invention.

The circuit that sets the substrate voltage may also be a fixed, higher value voltage source and resistance divider, or a regulated voltage source set to the desired value, optionally with a resistor inserted between the source and substrate to minimize the impact of conductive bridges.

Figure 7:
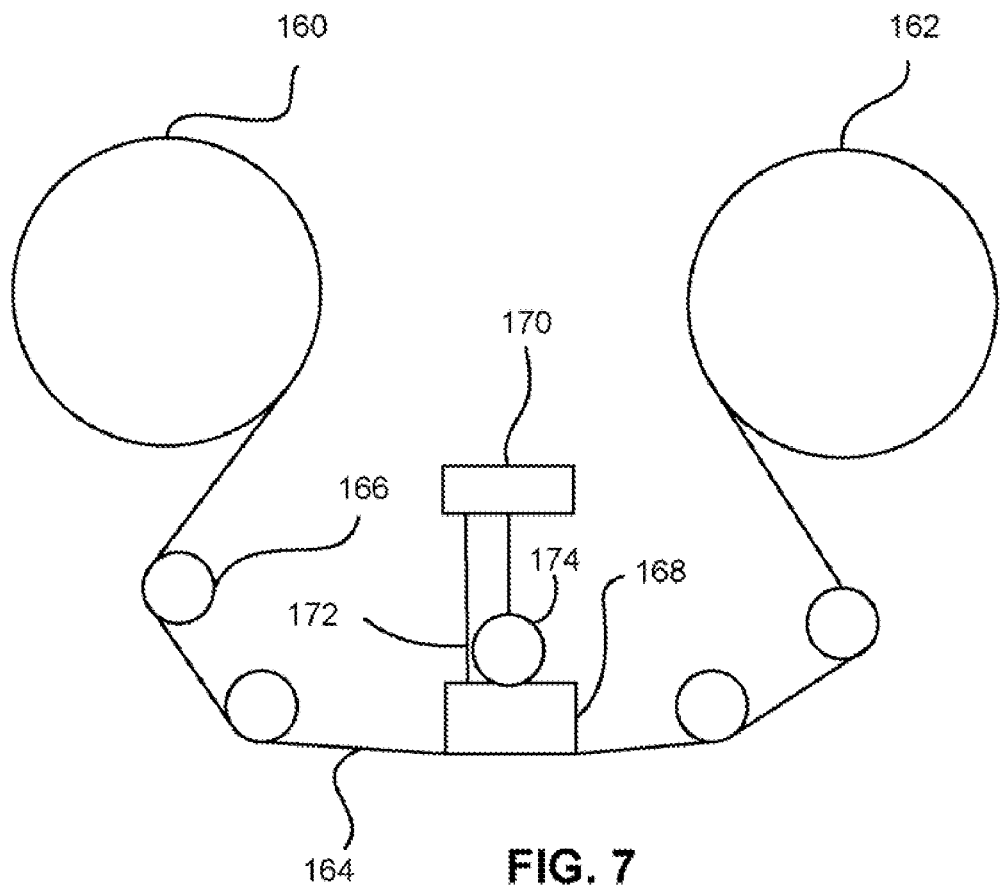
FIG. 7 is a system diagram of a magnetic data storage system.

FIG. 7 illustrates a simplified magnetic recording system, particularly a tape drive and magnetic recording medium, which may be employed in the context of the present invention.

As shown, a tape supply cartridge 160 and a take-up reel 162 are provided to support a tape 164. These may form part of a removable cassette and are not necessarily part of the system. Guides 166 guide the tape 164 across a preferably bidirectional tape head 168, of the type disclosed herein. Such tape head 168 is in turn coupled to a controller assembly 170 via a connector cable 172. The controller 170, in turn, controls head functions such as servo following, write bursts, read functions, etc.

A tape drive, such as that illustrated in FIG. 7, includes drive motor(s) to drive the tape supply cartridge 160 and the take-up reel 162 to move the tape 164 linearly over the head 168. The tape drive also includes a read/write channel to transmit data to the head 168 to be recorded on the tape 164 and to receive data read by the head 168 from the tape 164. An interface is also provided for communication between the tape drive and a host (integral or external) to send and receive the data and for controlling the operation of the tape drive and communicating the status of the tape drive to the host, all as will be understood by those of skill in the art.

There have thus been disclosed systems which address the difficulty of setting the conductive head substrate and MR shields and writer poles all at the same potential and in such a way that minimizes the impact of substrate-to-shield and shield-to-sensor shorting on drive performance.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A magnetic data storage system, comprising:
   a head having a reader, the reader further comprising a shield, a sensor, and leads coupled to the sensor;
   a charge clamp circuit electrically coupling the shield to the leads; and
   a bias circuit for passing a bias current through the sensor via the leads;
   wherein the bias circuit maintains a potential of the shield at about a ground potential.

2. A system as recited in claim 1, wherein the ground potential is about zero volts.

3. A system as recited in claim 1, wherein the head further comprises a substrate and an electrically insulating layer positioned between the substrate and the shield, wherein the substrate is at about the ground potential.

4. A system as recited in claim 1, wherein the charge clamp circuit includes a pair of resistors, each resistor being coupled to one of the leads, wherein the shield is electrically coupled to the charge clamp circuit at a point between the resistors.

5. A system as recited in claim 4, further comprising a second shield, the second shield also being coupled to the leads by the charge clamp circuit.

6. A system as recited in claim 1, wherein the bias circuit includes a positive voltage source and a negative voltage source.

7. A system as recited in claim 6, wherein the positive voltage source produces a voltage having a positive value, wherein the negative voltage source produces a voltage having a negative value that is the inverse of the positive value.

8. A system as recited in claim 1, further comprising:
   a drive mechanism for passing a magnetic recording tape over the head; and
   a controller electrically coupled to the head.

9. A magnetic data storage system, comprising:
   a head having a reader, the reader further comprising a shield, a sensor, and leads coupled to the sensor;
   a charge clamp circuit electrically coupling the shield to the leads; and
   a bias circuit for passing a bias current through the sensor via the leads, the bias circuit including a positive voltage source and a negative voltage source.

10. A system as recited in claim 9, wherein the bias circuit maintains a potential of the shields at about a predetermined potential.

11. A system as recited in claim 10, wherein the bias circuit maintains a potential of the shields at about a ground potential.

12. A system as recited in claim 9, wherein the charge clamp circuit includes a pair of resistors, each resistor being coupled to one of the leads, wherein the shield is electrically coupled to the charge clamp circuit at a point between the resistors.

13. A system as recited in claim 9, wherein the positive voltage source produces a voltage having a positive value, wherein the negative voltage source produces a voltage having a negative value that is the inverse of the positive value.

14. A magnetic data storage system, comprising:
   a head having a plurality of readers formed above a common substrate, each reader further comprising a shield, a sensor, and leads coupled to the sensor;
   for each reader, a charge clamp circuit electrically coupling the shield to the leads; and
   a bias circuit for passing a bias current through at least one of the sensors via the leads;
   wherein the bias circuit maintains a potential of the shields at about a ground potential.

15. A system as recited in claim 14, wherein the charge clamp circuit includes a pair of resistors, each resistor being coupled to one of the leads, wherein the shield is electrically coupled to the charge clamp circuit at a point between the resistors.

16. A system as recited in claim 14, wherein the same biasing circuit is operatively coupled to all of the leads.

17. A system as recited in claim 16, further comprising, for each sensor, a pair of resistors associated therewith, one resistor being coupled to each of the leads and positioned between the biasing circuit and the associated sensor, at least two of the pairs of resistors having different total resistance values.

18. A system as recited in claim 14, wherein multiple biasing circuits are present, each biasing circuit being operatively coupled to one of the sensors.

19. A system as recited in claim 14, further comprising:
   a drive mechanism for passing a magnetic recording tape over the head; and
   a controller electrically coupled to the head.

20. A magnetic data storage system, comprising:
   a head having a plurality of readers formed above a common substrate, each reader further comprising a shield, a sensor, and leads coupled to the sensor;
   for each reader, a charge clamp circuit electrically coupling the shield to the leads; and
   a bias circuit for passing a bias current through the sensor via the leads, the bias circuit including a positive voltage source and a negative voltage source.

* * * * *